UNITED STATES PATENT OFFICE.

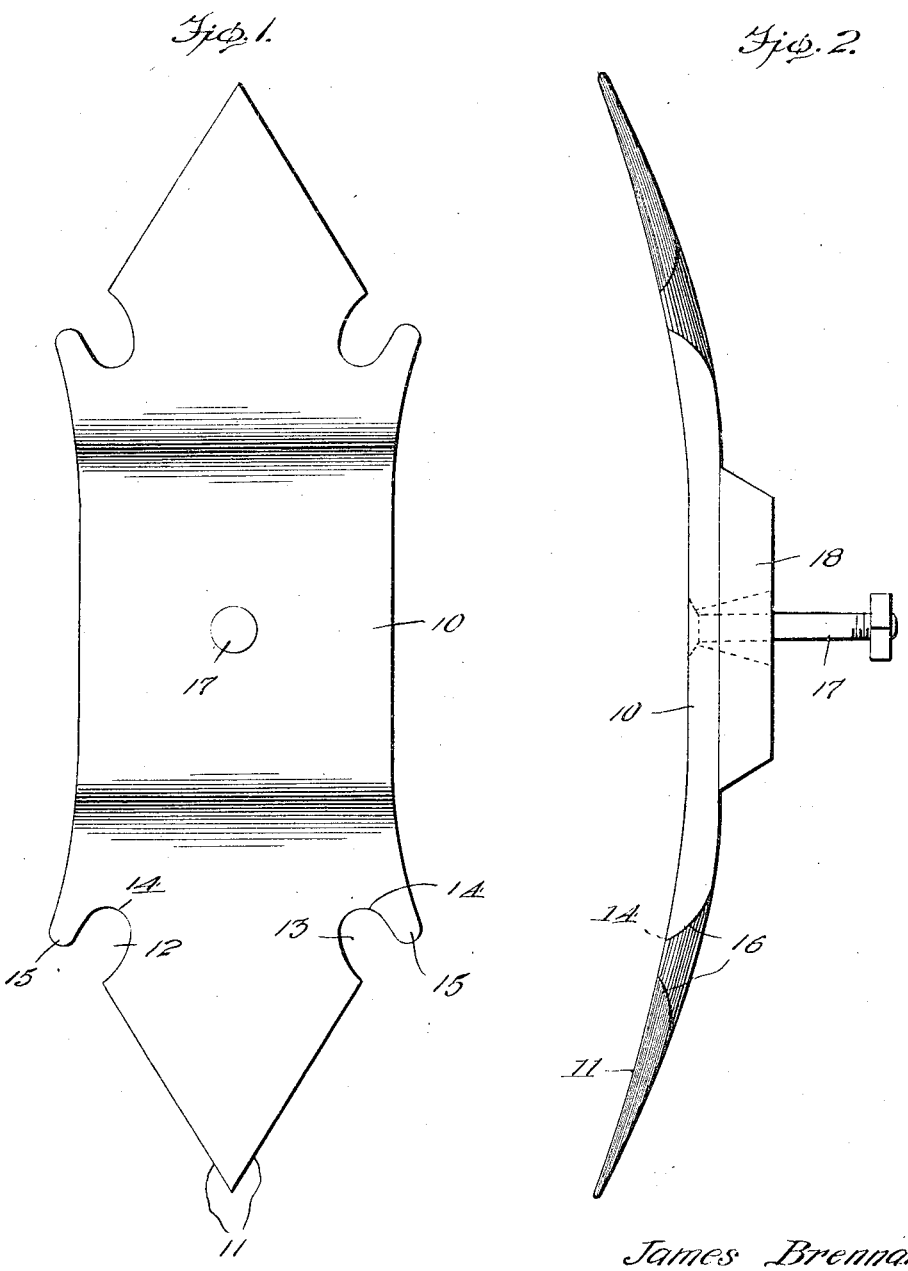

JAMES BRENNAN, OF MONTPELIER, INDIANA.

CULTIVATOR-SHOVEL.

1,289,629.   Specification of Letters Patent.   Patented Dec. 31, 1918.

Application filed December 9, 1916. Serial No. 136,041.

*To all whom it may concern:*

Be it known that I, JAMES BRENNAN, a citizen of the United States, residing at Montpelier, in the county of Blackford and State of Indiana, have invented certain new and useful Improvements in Cultivator-Shovels, of which the following is a specification.

The present invention relates to new and useful improvements in cultivator teeth, the invention having as its primary object the provision of a cultivator shovel embodying a blade provided with divergent cutting edges terminating in hook knives whereby during the cultivating process weeds and other undesirable growth in the earth may be destroyed.

It is well known to those skilled in the art that divergent edged blades have been employed for cultivating purposes but very often when large roots are struck the same are deflected along the edges of the blades and are not cut. My invention contemplates the provision of a blade having means which is disposed to engage the undesirable roots should the same escape the divergent cutting edges and effectively sever the same. The cutting elements mentioned are in the form of auxiliary knives formed integrally with the blade and disposed at the terminal ends of the divergent edges, so that objects slipping from the edges are engaged by said cutting elements.

Another object of my invention is to provide a cultivator shovel of the class described which is strong and durable, may be formed from a single blank of metal, may be cheaply manufactured, and may be installed for use on any standard cultivator frame.

Other objects and advantages to be derived from my improved cultivator shovel will appear from the following detailed description and the claim, taken with an inspection of the accompanying drawing, in which:

Figure 1 is a front elevational view of a cultivator shovel embodying the improvements of my invention; and Fig. 2 is a side elevational view of the same.

Referring more particularly to the drawing, wherein similar characters of reference designate like and corresponding parts throughout the various views, 10 designates the body of my improved cultivator shovel, the form shown in the drawing being reversible. In view of the fact that both ends of the tooth are identical I shall describe but one of the same.

As it will be best seen from Fig. 1 the ends of the shovel body 10 are tapered to provide divergent cutting edges 11, the upper ends of said edges terminating adjacent the recesses 12 and 13 formed at opposite points on the longitudinal margins of the body 10, said recesses being substantially semi-circular, the peripheral edges thereof designated 14 being adapted to cut objects engaged therewith. A pair of tongues or deflectors designated 15 are provided, said deflectors projecting slightly beyond the edges 11 so that objects slipping off the ends of the cutting edges 11 will be deflected into the recesses 12 and 13 by said tongues 12. The edges of the tongues as well as the recesses are adapted to cut so that when in use weeds and roots or other undesirable growths escape the cutting edges 11 the same are gathered by the tongues 15 and deflected inwardly to be engaged by the cutting edges 14 of the recesses 12. In this manner I overcome the difficulty heretofore encountered with cultivator teeth having divergent edges.

Upon reference to Fig. 2 it will be noted that the cutting portions of the cultivator shovel body are curved slightly in order to afford a draw-cut when in use facilitating the cutting operation. The cutting edges 11 and 14 are afforded by beveling the margins of the body 10 from the rear face to the front face as indicated at 16 in Fig. 2. This formation of the cutting edges presents the edges at points most desired, thereby enhancing the efficiency of the cutting shovel.

A bolt 17 is carried by the body 10, said bolt being adapted to engage any standard cultivator frame, a clamp 18 being carried by the bolt to engage such a frame. To permit lateral movement of the bolt 17 in order that it may adjust itself properly to practically any form of beam, curved or straight, the seat as formed in the shovel and clamp is tapered, the same enlarging inwardly. Of course, I do not limit myself to any particular manner of mounting the shovel of my invention, but it has been found advantageous to mount the shovel rotatably or reversibly so that the form shown in the drawing is to be preferred. Of course, single ended teeth may be employed if desired or where there is not sufficient room to permit of the installation of double ended teeth as shown in the drawing. I desire to lay particular stress upon the fact that my improved cultivator shovel may be formed from a single blank of metal, the general contour of the same being formed at one operation. Of course, it is then necessary that the cutting edges be provided in the usual manner, that is, by grinding.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent is:—

A cultivator shovel curved throughout its length and having its opposite ends tapered and formed with cutting edges, the inner portions of the tapered ends having recesses formed in their sides, and tongues formed on the shovel adjacent the tapered ends thereof arranged in planes corresponding with the planes in which the tapered ends are arranged, said tongues extending slightly beyond the cutting edges of the tapered ends, the inner marginal portions of the tongues and the marginal portions of the shovel adjacent the recesses being sharpened.

In testimony whereof, I affix my signature hereto.

JAMES BRENNAN.

Copies of this patent may be obtained for five cents each, by addressing the "Commissioner of Patents, Washington, D. C."